United States Patent [19]
Richmond et al.

[11] Patent Number: 6,145,333
[45] Date of Patent: Nov. 14, 2000

[54] FOOD PRESERVING SYSTEMS

[76] Inventors: Neil E. Richmond, 6101 Monmouth Ave., Suite 1011, Ventnor, N.J. 08406; Renald M. Corsi, 501 Abbott Rd., 2nd Floor, Suite 5, Broomall, Pa. 19008

[21] Appl. No.: 09/505,826

[22] Filed: Feb. 17, 2000

Related U.S. Application Data

[63] Continuation-in-part of application No. 09/303,757, May 3, 1999.

[51] Int. Cl.[7] .................................................. F25D 23/00
[52] U.S. Cl. ......................... 62/258; 62/457.2; 219/385; 220/592.02
[58] Field of Search ................... 62/258, 457.2, 62/457.5, 457.6, 457.7; 220/592.02; 219/385, 386, 387, 438, 439, 521

[56] References Cited

U.S. PATENT DOCUMENTS

| | | |
|---|---|---|
| 1,571,438 | 2/1926 | Schopf . |
| 2,144,504 | 1/1939 | Money . |
| 3,187,518 | 6/1965 | Bair et al. . |
| 3,747,364 | 7/1973 | Laing . |
| 4,356,708 | 11/1982 | Horton . |
| 4,499,998 | 2/1985 | Carlson . |
| 4,798,173 | 1/1989 | Wilgren . |
| 4,815,287 | 3/1989 | O'Daniel . |
| 4,856,579 | 8/1989 | Wolfe . |
| 4,989,419 | 2/1991 | Brando . |
| 5,231,850 | 8/1993 | Morris . |
| 5,247,807 | 9/1993 | Jarman et al. . |
| 5,307,647 | 5/1994 | McClure . |
| 5,359,864 | 11/1994 | Yamada . |
| 5,408,845 | 4/1995 | Forshaw et al. . |
| 5,544,495 | 8/1996 | Anderson et al. . |
| 5,568,735 | 10/1996 | Newkirk et al. . |
| 5,701,757 | 12/1997 | Heverly . |
| 5,718,124 | 2/1998 | Senecal . |
| 5,845,514 | 12/1998 | Clarke et al. . |

*Primary Examiner*—William E. Tapolcai
*Attorney, Agent, or Firm*—Norman E. Lehrer

[57] ABSTRACT

A refrigeration system for maintaining edible substances at a low temperature of the present invention includes a serving pan, an element for retaining or holding the serving pan, and a refrigeration tube and a glycol medium surrounding the pan is disclosed. The refrigeration tube and glycol medium act together in order to maintain the pan at a low temperature for a prolonged period of time and to provide an even cooling of the pan. In a second embodiment, the refrigeration tube may be surrounded by the glycol medium. In a further embodiment, the system may be used to heat food rather than to cool food by using a heat pump alone or in combination with electric heating elements.

16 Claims, 3 Drawing Sheets

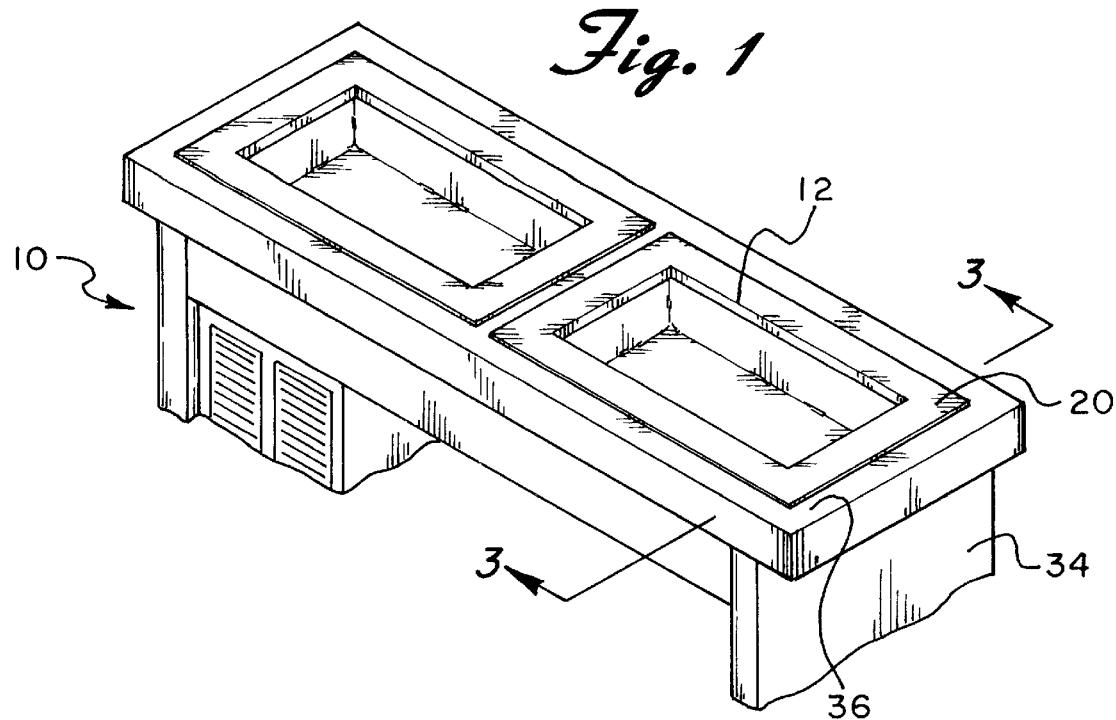
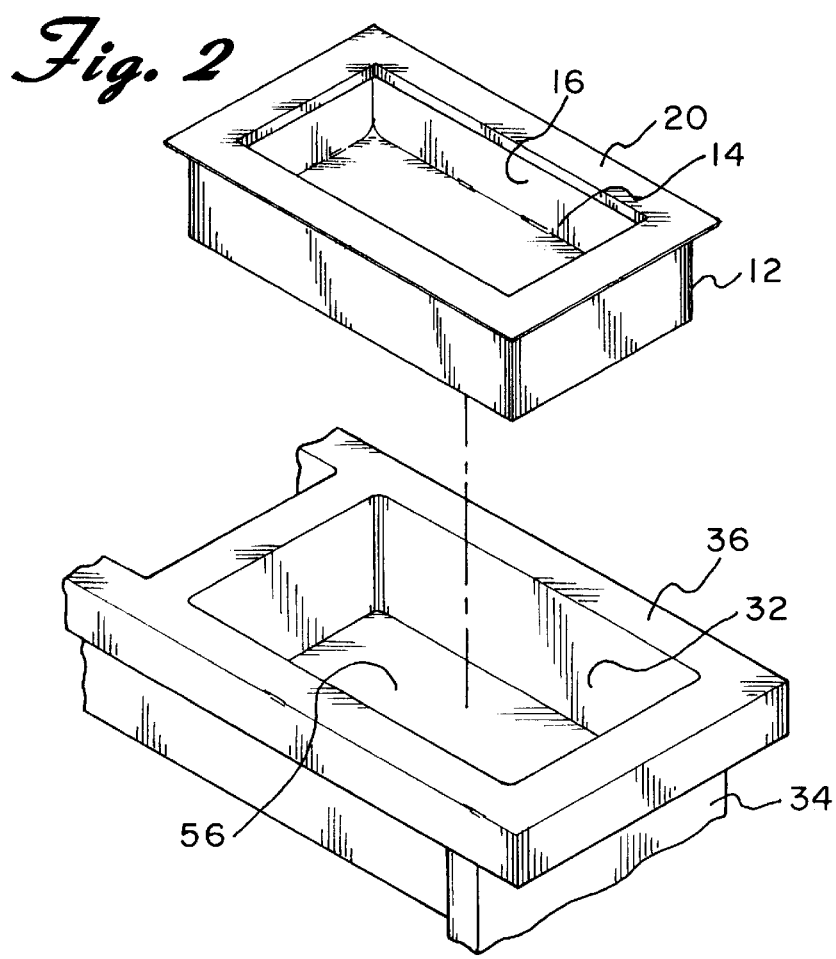

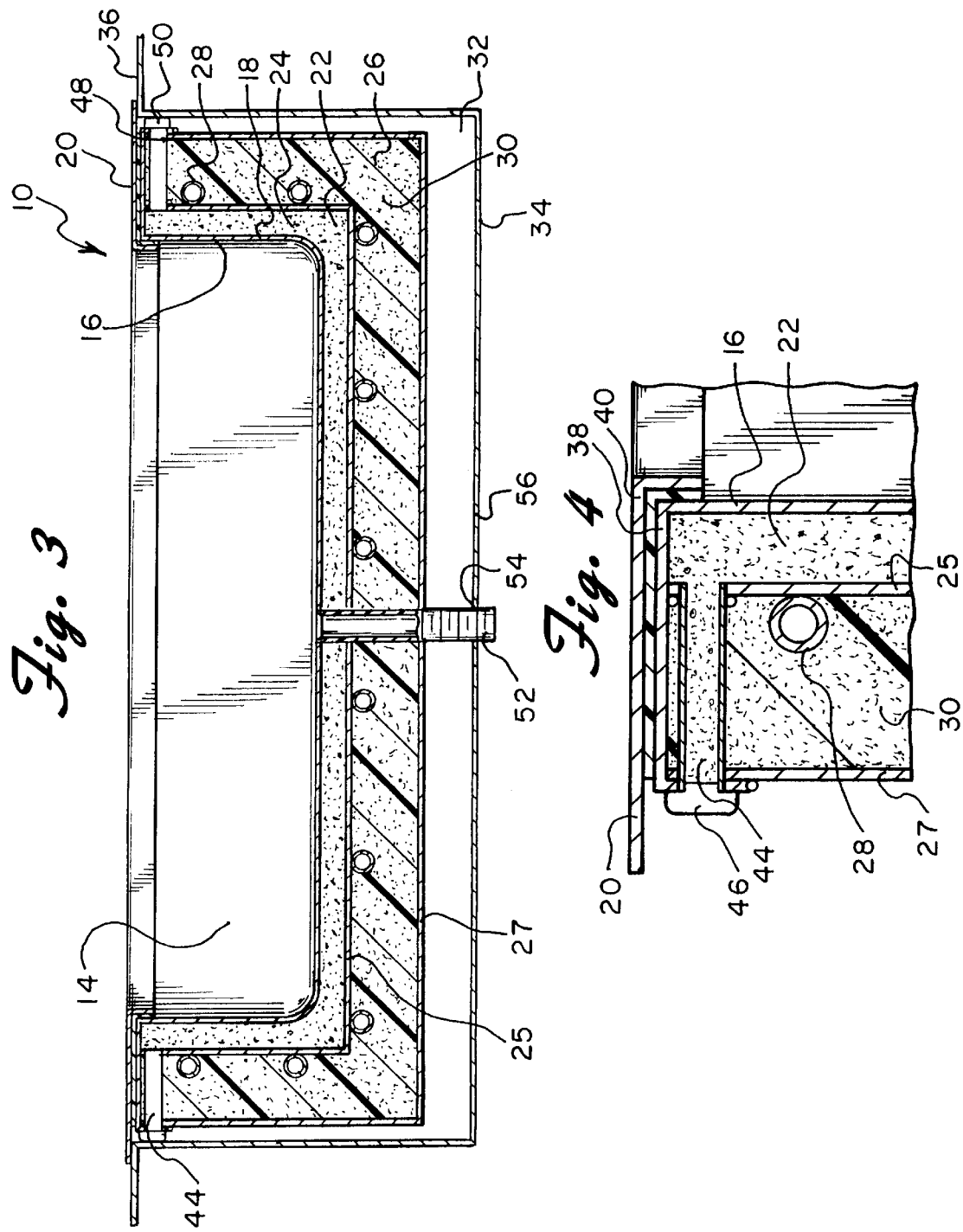

FOOD PRESERVING SYSTEMS

CROSS-REFERENCE TO RELATED APPLICATION

This application is a Continuation-In-Part of co-pending U.S. patent application Ser. No. 09/303,757 filed May 3, 1999.

BACKGROUND OF THE INVENTION

The present invention is directed toward refrigeration and heating systems to be used in the food service industry and more particularly, toward serving pans and the like which are maintained at a low or a high temperature for prolonged periods of time and that are cooled or heated uniformly.

A problem facing many businesses in the food industry is the inability to maintain the temperature of foods meant to be kept cold or, particularly in a salad bar type of setting or in other settings where it may be necessary to keep foods chilled for extended periods of time after they have been removed from normal refrigeration facilities. Particularly difficult is the inability to maintain cold temperatures at the upper level of the foods which is require by the health authorities. That is, while it is normally too difficult to maintain salad or the like located near the bottom of a serving pan at a relatively cold temperature, it is difficult to maintain salad or a similar food at the top of the pan at an equally cold temperature.

In one type of salad bar arrangement, for example, shallow pans are placed within wells of a cabinet or service counter. The crocks or containers of food or food itself is then placed within the pans and crushed ice is then placed around the containers or the food. Alternatively, the ice may be placed within the pans first and then the containers may be placed in the ice. A problem with this type of arrangement is that it is difficult to maintain a suitable temperature for the food. That is, as the ice melts, it is necessary to continuously refill the pans with ice in order to maintain an appropriate temperature. This type of refrigeration system also requires constant supervision and maintenance.

Another typical salad bar has a refrigeration coil under the pans holding the crocks or containers of food or the food. Again, the problem with this type of system is that it is difficult to maintain a suitable temperature. That is, the food either freezes if it directly overlies a refrigeration coil or becomes too warm. Furthermore, the cooling tends not to be uniformly distributed to all of the food or containers particularly near the top of the pan. In these types of arrangements, in order to lower the temperature sufficiently near the top of the pan, the refrigeration coils must be so cold that food at the bottom of the pan which may be in close proximity to the coils freezes or deteriorates as a result of the very cold temperature.

U.S. Pat. No. 5,247,807 to Jarman et al. discloses a refrigerated condiments container which can be used in a salad bar. The container rests within a chamber which has refrigeration coils. The problem with this system, however, is that it is difficult to maintain a suitable temperature for the food. Also, the containers are not cooled uniformly, therefore the food within the containers is not kept cold with uniformity.

U.S. Pat. No. 4,989,419 to Brando et al. discloses a food service tray having a top tray and a bottom tray with a container being held within a hollow member formed in the top tray. The top tray and bottom tray form a chamber therebetween which is filled with a gel in order to keep the container chilled for an extended period of time. The problem with this type of system is that the use of gel still does not allow the food to be maintained at a low enough temperature as there is no way of continuously refrigerating the gel.

SUMMARY OF THE INVENTION

The present invention is designed to overcome the deficiencies of the prior art discussed above. It is an object of the present invention to provide a refrigeration system for maintaining serving pans and the like at temperatures lower than prior art systems are capable of maintaining.

It is another object of the present invention to provide a refrigeration system which allows serving pans to be maintained at a low temperature for a prolonged period of time.

It is a further object of the present invention to provide a refrigeration system which allows uniform cooling of serving pans and which allows food near the top of a pan to be cooled without injuring the food near the bottom.

It is another object of the present invention to provide a heating system which allows uniform heating of serving pans and which allows food near the top of a pan to be heated without injuring the food near the bottom.

In accordance with the illustrative embodiments demonstrating features and advantages of the present invention, there is provided a refrigeration system which maintains serving pans and the like at a temperature that is lower than the temperature at which prior art pans are maintained. The system includes a pan which fits into a well of a counter or cabinet. The pan includes of a compartment within which food is kept. This compartment is surrounded by a layer of glycol medium and surrounding this layer is a refrigeration tube which is surrounded by insulation.

In an alternative embodiment of the present invention, the refrigeration tube may be located within the glycol medium.

In yet another embodiment, a heat pump and/or electric heating elements may used in either of the embodiments described above.

Other objects, features, and advantages of the invention will be readily apparent from the following detailed description of preferred embodiments thereof taken in conjunction with the drawings.

BRIEF DESCRIPTION OF THE DRAWINGS

For the purpose of illustrating the invention, there is shown in the accompanying drawings forms which are presently preferred; it being understood that the invention is not intended to be limited to the precise arrangements and instrumentalities shown.

FIG. 1 is a perspective view of a pan of the present invention placed within the well of a counter;

FIG. 2 is an exploded view of the pan and the counter of the present invention;

FIG. 3 is a cross-sectional view taken along line 3—3 of FIG. 1;

FIG. 4 is an exploded, cross-sectional view of a portion of the pan of the present invention.

DETAILED DESCRIPTION OF THE PREFERRED EMBODIMENTS

Figure 5:
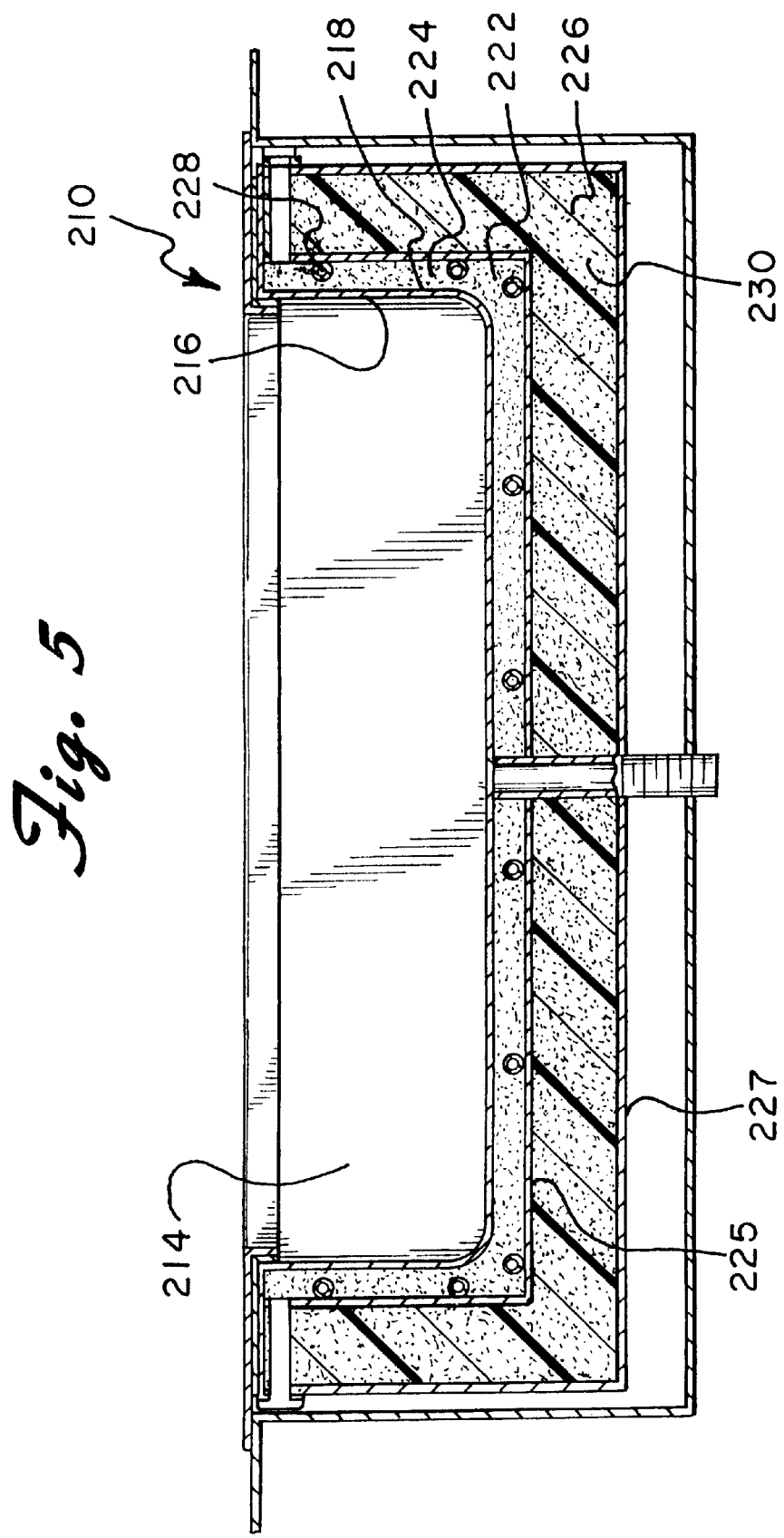
FIG. 5 is a cross-sectional view of a second embodiment of the present invention.

Referring now to the drawings in detail wherein like reference numerals have been used throughout the various figures to designate like elements, there is shown in FIG. 1 a refrigeration system constructed in accordance with the principles of the present invention and designated generally as 10.

The refrigeration system 10 of the present invention includes a serving pan 12 or any other type of means for holding edible substances. The pan 12 may be made from stainless steel or any other type of metal which is typically used in the food service industry. While the pan 12 has been shown as being generally rectangular, it should be understood that this is merely for illustration purposes and that a pan of substantially any shape may be used. The pan 12 includes a first compartment 14 for holding food and has an inner wall 16 and an outer wall 18. Secured to the uppermost portions of the inner and outer walls 16 and 18 and extending along the periphery of the pan 12 is a flange 20. The purpose of the flange 20 will be discussed in greater detail below.

Surrounding the bottom and sides of the first compartment 14 is a glycol medium 22 which is contained within a second compartment 24 bounded by walls 18 and 25. Surrounding the wall 25 which forms the bottom and sides of the second compartment 24 is a third compartment 26 containing a refrigeration tube 28 preferably in the form of a coil or the like. The refrigeration coil 28 is surrounded by insulation 30 which, in turn, is bounded by outer wall 27 of the pan 12. (See FIG. 3.)

Refrigeration coil 28 is preferably comprised of copper tubing or the like filled with a coolant such as Freon or similar material and is welded or otherwise securely affixed directly to the outer surface of wall 25. Although not specifically shown, it will be understood that the coil 28 is connected to a refrigeration system in order to continuously or intermittently chill the liquid or gas within the coil. This is preferably done utilizing flexible tubing or the like so that the pan 12 can be lifted up or moved for cleaning or other purposes as shown in FIG. 2. The walls 16, 25 and 27 of compartments 14, 24, and 26 are preferably made of stainless steel or similar metal and are secured to each other by welding or any other type of securing means well known in the art. Alternatively, the coil 28 need not be affixed to the outer surface of the wall 25.

The pan 12 fits within a well 32 of a metal counter or cabinet 34 or any other type of means for retaining a serving pan with the flange 20 resting on the top surface 36 of the counter 34 so that the pan 12 is removably held within the well 32. Secured to the uppermost part of the inner wall 16 and along the top wall 38 which connects inner wall 16 to outermost wall 27 of pan 12 is a plastic breaker strip 40. The flange 20 is secured to the plastic strip 40 by any means well known in the art, such as heat sealing or through the use of adhesives or the like. The breaker strip 40 acts as an insulator for the pan 12 by separating the metal flange 20 from the metal inner wall 16 and metal top wall 38.

As should be readily apparent to those skilled in the art, by thermally separating the flange 20 from the walls 16 and 38, heat is prevented from being transferred between the top surface 36 of the counter 34 and the walls 16 and 38. That is, if the pan 12 were set into the well 32 of the counter 34, with the flange 20 directly contacting the top surface 36 of the counter 34 and the inner and top walls 16 and 18, the counter 34 would act as a heat sink so that heat would transfer from the counter to the pan 12. The flange 20 and breaker strip 40 prevent this dissipation of heat by creating a separation between the operational parts of the pan 12 and the top surface 36 of the counter 34. Thus, cold is retained by the pan 12.

Extending through the outermost wall 27 of the pan 12 at a position downwardly from the top wall 38 is a fill tube 44 which extends through the third compartment 26 and is used to fill the second compartment 24 with the glycol medium or similar gel or solution 22. The outside end of the tube 44 is closed by a cap 46 so that once the second compartment 24 has been filled, the tube 44 may be closed. (See FIG. 4.) Another tube 48 is located on another side of the pan 12 and is used as an air vent during the filling of the second compartment. The outside end of tube 48 may also be covered with a cap 50 when not in use. A drain tube 52 extends from the bottom of the first compartment 14 through the walls 16, 25 and 27 in order to drain any excess moisture or liquid they may accumulate. The drain tube 52 can either be connected to a flexible drain line or pass through an opening 54 in the wall 56 at the bottom of the well 34.

In the present invention, the refrigeration tube 28 and glycol medium 22 act together as means for more uniformly distributing the refrigeration and maintaining the pan at a lower temperature for a prolonged period of time. The location of the refrigeration tube and medium provides for a more uniform cooling of the pan in that cold is first transferred from the coil 28 to the wall 25, then to the glycol 22 and then to the inner wall 16. The present system also provides for maintaining a much lower temperature than prior art refrigeration systems of the same type without fear of spoiling food that would otherwise come into closer contact with a refrigeration coil. As a result, edible substances may be maintained within the pan at more uniform and lower temperatures for a prolonged period of time. Thus, less maintenance and supervision of the pan is required.

A second embodiment of the present invention is shown in FIG. 5. The structure of the system 210 described in this embodiment differs from the system of the first embodiment only to the extent discussed below. All other structural and functional aspects of the two systems are identical and will not be repeated here.

In this embodiment the serving pan includes a first compartment 214 for holding food and has an inner wall 216 and an outer wall 218. Surrounding the bottom and sides of the first compartment 214 is a glycol medium 222 which is contained within a second compartment 224 bounded by walls 218 and 225. Located within compartment 224 is a refrigeration tube 228 preferably in the form of a coil or the like. Surrounding the wall 225 which forms the bottom and sides of the second compartment 224 is a third compartment 226 which is bounded by outer wall 227 of the pan.

Refrigeration coil 228 is preferably comprised of copper tubing or the like and is filled with a coolant as described above. The coil 228 may be welded or otherwise securely affixed directly to the inner surface of wall 225. Alternatively, the coil 228 need not be affixed to the wall 225. Although not specifically shown, it should be understood that the coil 228 is connected to a refrigeration system in order to continuously or intermittently chill liquid or gas within the coil.

In either embodiment described above, a heat pump may be used to supply a heating system rather than a refrigeration system. That is, the refrigeration coil may be filled with a heated fluid. The system is then reversed in order to heat the medium 22 or 222 rather than to chill the same. The refrigeration system may act as a heat pump so that hot fluid is pumped through the coils. Alternatively, hot fluid may be supplied by a boiler system or other sources of heated fluid. Furthermore, in addition to or in lieu of the coils, electric resistance wires or other heating elements may be used in the system to heat the medium 22 or 222.

The present invention may be embodied in other specific forms without departing from the spirit or essential attributes thereof and accordingly, reference should be made to the appended claims rather than to the foregoing specification as indicating the scope of the invention.

We claim:

1. A refrigeration system for maintaining food at a low temperature comprising:

a pan having an inner metal wall comprised of a bottom wall and surrounding side walls forming a first compartment into which food may be placed;

a metal outer wall comprised of a bottom wall and surrounding side walls secured to but spaced from said inner wall so as to create a second compartment therebetween;

a chillable fluid material located within said second compartment;

a refrigeration coil secured to the inner surface of said outer wall at the bottom and at the sides thereof for chilling said outer wall and said chillable fluid material; and a substantially horizontally extending flange extending outwardly from the top of said pan, said flange being thermally insulated from inner wall of said pan whereby said pan can be inserted into the well of a serving counter with said flange contacting said counter but wherein said inner wall of said pan is thermally insulated from said counter.

2. The refrigeration system as claimed in claim 1 further including means for filling said second compartment with said chillable fluid material.

3. The refrigeration system as claimed in claim 1 further including a drain tube extending from the inner surface of said pan to the exterior thereof.

4. The refrigeration system as claimed in claim 1 wherein said chillable fluid material is glycol.

5. A heating system for maintaining food at a high temperature comprising:

a pan having an inner metal wall comprised of a bottom wall and surrounding side walls forming a first compartment into which food may be placed;

a metal outer wall comprised of a bottom wall and surrounding side walls secured to but spaced from said inner wall so as to create a second compartment therebetween;

a heatable fluid material located within said second compartment;

a heating coil secured to the inner surface of said outer wall at the bottom and at the sides thereof for heating said outer wall and said heatable fluid material; and a substantially horizontally extending flange extending outwardly from the top of said pan, said flange being thermally insulated from inner wall of said pan whereby said pan can be inserted into the well of a serving counter with said flange contacting said counter but wherein said inner wall of said pan is thermally insulated from said counter.

6. The heating system as claimed in claim 5 further including means for filling said second compartment with said heatable fluid material.

7. The heating system as claimed in claim 5 further including a drain tube extending from the inner surface of said pan to the exterior thereof.

8. The heating system as claimed in claim 6 wherein said heatable fluid material is glycol.

9. A heating system for maintaining food at a high temperature comprising:

a pan having an inner metal wall comprised of a bottom wall and surrounding side walls forming a first compartment into which food may be placed;

a metal outer wall comprised of a bottom wall and surrounding side walls secured to but spaced from said inner wall so as to create a second compartment therebetween;

a heatable fluid material located within said second compartment;

a heating coil secured to the outer surface of said outer wall at the bottom and at the sides thereof for heating said outer wall and said heatable fluid material; and a substantially horizontally extending flange extending outwardly from the top of said pan, said flange being thermally insulated from inner wall of said pan whereby said pan can be inserted into the well of a serving counter with said flange contacting said counter but wherein said inner wall of said pan is thermally insulated from said counter.

10. The heating system as claimed in claim 9 further including means for filling said second compartment with said heatable fluid material.

11. The heating system as claimed in claim 9 further including a drain tube extending from the inner surface of said pan to the exterior thereof.

12. The heating system as claimed in claim 9 wherein said heatable fluid material is glycol.

13. A heating system for maintaining food at a high temperature comprising:

a pan having an inner metal wall comprised of a bottom wall and surrounding side walls forming a first compartment into which food may be placed;

a metal outer wall comprised of a bottom wall and surrounding side walls secured to but spaced from said inner wall so as to create a second compartment therebetween;

a heatable fluid material located within said second compartment;

an electric heating element within said second compartment for heating said heatable fluid material; and a substantially horizontally extending flange extending outwardly from the top of said pan, said flange being thermally insulated from inner wall of said pan whereby said pan can be inserted into the well of a serving counter with said flange contacting said counter but wherein said inner wall of said pan is thermally insulated from said counter.

14. The heating system as claimed in claim 13 further including means for filling said second compartment with said heatable fluid material.

15. The heating system as claimed in claim 13 further including a drain tube extending from the inner surface of said pan to the exterior thereof.

16. The heating system as claimed in claim 13 wherein said heatable fluid material is glycol.

* * * * *